US008215561B2

(12) United States Patent
Kai et al.

(10) Patent No.: US 8,215,561 B2
(45) Date of Patent: Jul. 10, 2012

(54) ANTENNA AND READER/WRITER DEVICE

(75) Inventors: Manabu Kai, Kawasaki (JP); Teruhisa Ninomiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 447 days.

(21) Appl. No.: 12/458,026

(22) Filed: Jun. 29, 2009

(65) Prior Publication Data

US 2010/0078486 A1 Apr. 1, 2010

(30) Foreign Application Priority Data

Sep. 30, 2008 (JP) ................................. 2008-255312

(51) Int. Cl.
*G06K 19/06* (2006.01)

(52) U.S. Cl. ..................................... 235/492; 340/572.7

(58) Field of Classification Search .................. 235/492; 340/572.7; 343/732, 866
See application file for complete search history.

(56) References Cited

U.S. PATENT DOCUMENTS

| | | | | |
|---|---|---|---|---|
| 5,892,661 | A | 4/1999 | Stafford et al. | |
| 6,411,103 | B1 * | 6/2002 | Tobias et al. | 324/632 |
| 7,495,620 | B2 * | 2/2009 | Wang et al. | 343/702 |
| 7,755,546 | B2 * | 7/2010 | Ishimiya | 343/702 |
| 2002/0005809 | A1 | 1/2002 | Manteuffel et al. | |
| 2006/0132361 | A1 | 6/2006 | Lee | |
| 2007/0069957 | A1 | 3/2007 | Ranta | |
| 2007/0103373 | A1 | 5/2007 | Wallace et al. | |
| 2007/0268143 | A1 | 11/2007 | Copeland et al. | |
| 2008/0007457 | A1 | 1/2008 | Copeland et al. | |
| 2009/0219215 | A1 | 9/2009 | Huber et al. | |
| 2010/0194659 | A1 * | 8/2010 | Chakam et al. | 343/866 |

FOREIGN PATENT DOCUMENTS

| | | | |
|---|---|---|---|
| DE | 10 2005 049 820 | A1 | 4/2007 |
| EP | 0 840 251 | A2 | 5/1998 |
| EP | 1 154 518 | A2 | 11/2001 |
| EP | 1 764 866 | A1 | 3/2007 |
| JP | 2008-519571 | | 6/2008 |
| WO | 2004/045023 | A1 | 5/2004 |
| WO | 2004/062032 | A1 | 7/2004 |
| WO | 2006/050408 | A1 | 5/2006 |
| WO | 2006/050411 | | 5/2006 |

OTHER PUBLICATIONS

European Search Report mailed Oct. 15, 2009 and issued in corresponding European Patent Application 09164826.1.
European Office Action mailed May 6, 2011 in corresponding European Patent Application 09 164 826.1.

* cited by examiner

*Primary Examiner* — Ahshik Kim
(74) *Attorney, Agent, or Firm* — Fujitsu Patent Center

(57) ABSTRACT

An antenna includes a substrate made of a dielectric substance, and a conductor pattern formed on the substrate and including a feeding point, an open end, an extension part extending from the feeding point, and a spiral part extending spirally from an opposite end of the extension part to the open end. The spiral part includes a part juxtaposed with the extension part. A distance along length directions of the conductor pattern, from a zero point at which a current is zero in the part upon feeding power to the feeding point, to a point at which a line perpendicular to the part and passing through the zero point intersects the extension part, is set to a second distance at which an electric field strength generated as a combination of electric fields generated at these points upon the feeding of power enables communications with the wireless tag.

5 Claims, 5 Drawing Sheets

ANTENNA AND READER/WRITER DEVICE

CROSS-REFERENCE TO RELATED APPLICATION(S)

This application is based upon and claims the benefit of priority of the prior Japanese Patent Application No. 2008-255312, filed on Sep. 30, 2008, the entire contents of which are incorporated herein by reference.

FIELD

The embodiments discussed herein are directed to an antenna and a reader/writer device.

BACKGROUND

Recently, as a non-contact automatic identification technology, radio frequency identification (RFID) has been widely used. In the RFID, non-contact data communication is performed through radio waves between an integrated circuit (IC) tag including a semiconductor memory, and a reader/writer device that reads and writes data from and to the semiconductor memory of the IC tag.

The reader/writer device in the RFID includes a communication antenna (reader/writer antenna) that radiates a radio wave towards an IC tag. As illustrated in FIG. 13, as such a communication antenna, a patch antenna including a rectangular conductor pattern 212 for radiating a radio wave on a substrate 210 made of a dielectric substance is generally used.

For example, when such a patch antenna is used to identify a position of a small IC tag having a diameter of about 40 millimeters, the patch antenna also may be downsized to correspond with the IC tag.

However, simply downsizing the patch antenna decreases the radiation power to the IC tag, making position identification of the IC tag difficult. To avoid this problem, a dielectric substance having a high dielectric-constant such as a ceramic material may be used as the substrate of the patch antenna. However, the dielectric substance such as a ceramic material is expensive, and thus the use of the dielectric substance increases the manufacture cost. A glass epoxy resin such as FR-4, which is a dielectric substance less expensive than ceramic materials, may be used as the substrate of the patch antenna, but FR-4 has a lower dielectric constant than ceramic materials. Thus the entire antenna would need to be upsized to obtain the same radiation power as a ceramic material.

To ensure sufficient radiation power to an IC tag, various types of antennas including modified conductor patterns on their substrates have been proposed. For example, an antenna including a conductor pattern having a meander-lined shape is proposed (see Published Japanese Translation of PCT International Application No. 2008-519571). The surface area of the conductor relative to the substrate is made as large as possible by forming the conductor pattern to be meandered, thereby preventing a decrease in its radiation power.

However, for this antenna, if an inexpensive substrate having a low dielectric-constant such as an FR-4 substrate is used, the length of the conductor pattern to ensure sufficient radiation power to an IC tag may be increased, thereby increasing the size in the lengthwise direction of the conductor pattern. As a result, the size of the entire antenna is increased.

SUMMARY

According to an aspect of the invention, an antenna connectable to a reader-writer device configured to be communicatable with a wireless tag includes a substrate made of a dielectric substance, and a conductor pattern formed on the substrate. The conductor pattern includes a feeding point at one end of the conductor pattern, via which the antenna is connectable to the reader-writer device, an open end at another end of the conductor pattern, a feeding-side extension part extending for a first predetermined distance from the feeding point, and a spiral part extending spirally in a spiral shape from an opposite end of the feeding-side extension part opposite to the feeding point to the open end being a terminal end of the spiral part. The spiral part includes the open end and an open-end-side extension part positioned in juxtaposition with the feeding-side extension part. A distance along length directions of the conductor pattern, from a zero point at which a current is zero in the open-end-side extension part upon feeding power to the feeding point, to an intersection point at which a virtual straight line perpendicular to the open-end-side extension part and passing through the zero point intersects the feeding-side extension part, is set to a second predetermined distance at which a strength of an electric field generated as a combination of both electric fields generated at the zero point and the intersection point upon the feeding of power becomes a value that enables communications with the wireless tag.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Exemplary embodiments of an antenna and a reader-writer device according to the present invention will be explained below in detail with reference to the accompanying drawings.

Figure 1:
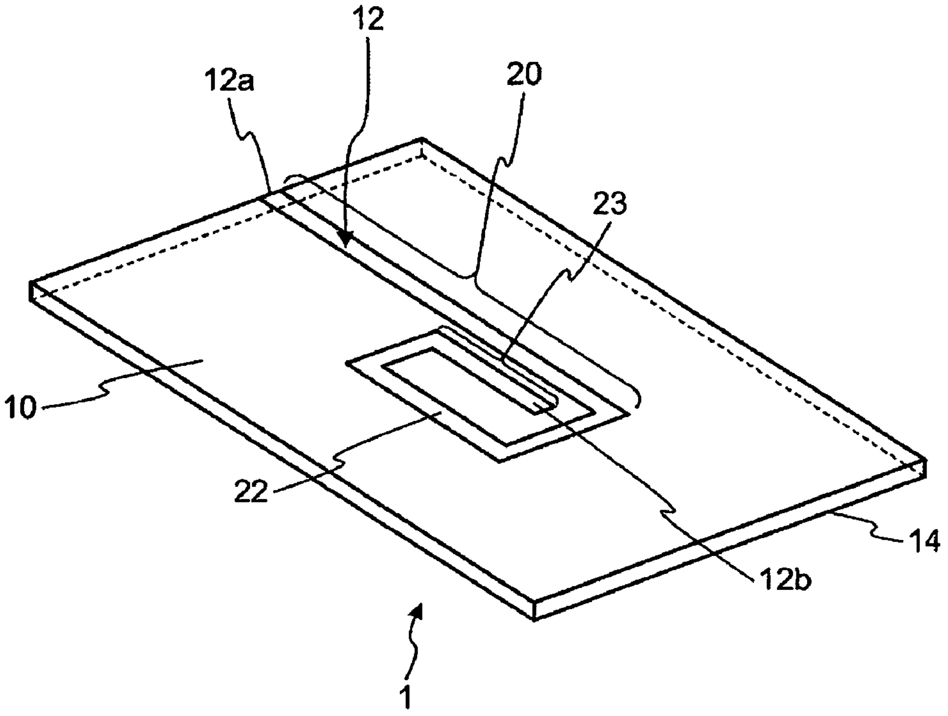
FIG. 1 is a perspective view of a configuration of an antenna according to an embodiment of the present invention.

A configuration of an antenna according to an embodiment of the present invention is explained first. FIG. 1 is a perspective view of the configuration of an antenna 1 according to the embodiment, and FIG. 2 is a schematic diagram of a state in which an IC tag 2 is placed on the antenna 1.

As illustrated in FIG. 1, the antenna 1 includes a substrate 10 made of a dielectric substance such as a glass epoxy resin, e.g., FR-4, a conductor pattern 12 formed on the substrate 10, and a ground (GND) 14 formed on an opposite surface of the conductor pattern 12 of the substrate 10. The conductor pattern 12 includes a feeding point 12*a* at an end of the conductor pattern 12 and an open end 12*b* at another end of the conductor pattern 12.

Figure 2:
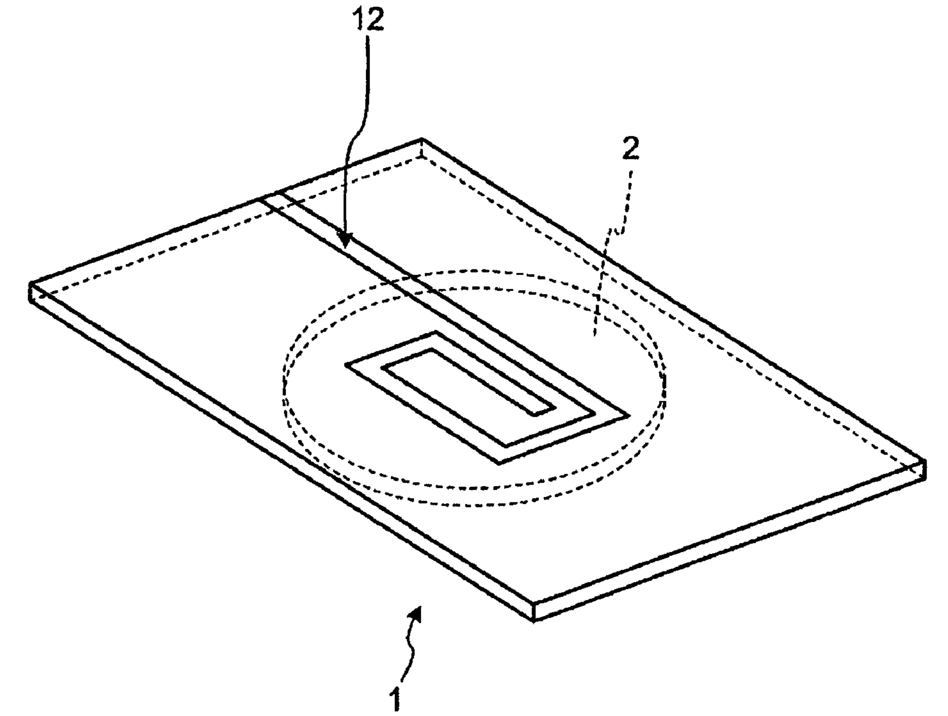
FIG. 2 is a schematic diagram of a state in which an IC tag is placed on the antenna according to the embodiment.

The antenna 1 is used in RFID, which is one of the automatic identification technologies, and is connected via the feeding point 12*a* to a reader-writer device (not illustrated) configured to be capable of communicating with the IC tag 2 including a semiconductor memory, as illustrated in FIG. 2. The reader/writer device transmits and receives radio waves via the antenna 1 to and from the IC tag 2 mounted on the antenna 1, thereby identifying a position of the IC tag 2 relative to the substrate 10 and reading and writing data from and to the semiconductor memory in the IC tag 2.

The conductor pattern 12 includes a feeding-side extension part 20 and a spiral part 22 connected to the feeding-side extension part 20, and is formed by bending a plural number of times a single continuous linear conductor.

The feeding-side extension part 20 extends linearly for a predetermined distance from the feeding point 12*a*. The spiral part 22 extends spirally from an end opposite to the feeding point 12*a* of the feeding-side extension part 20 to the open end 12*b* being a terminal end. In the present embodiment, the spiral part is quadrangular in shape. Four sides of a near-quadrangle are formed by bending four times the linear conductor forming the conductor pattern 12.

By connecting the end of the feeding-side extension part 20 with the spiral shaped spiral part 22, the entire conductor pattern 12 formed becomes more compact as compared to forming the conductor pattern 12 meandered in shape. As a result, a size increase of the entire antenna 1 is suppressed.

The spiral part 22 includes the open end 12*b* on an open end of the spiral part 22, and forms an open-end-side extension part 23 positioned in juxtaposition with the feeding-side extension part 20. The open-end-side extension part 23 and the feeding-side extension part 20 in juxtaposition means that the open-end-side extension part 23 and the feeding-side extension part 20 are positioned adjacent to each other with a predetermined interval in between, and includes a placement in which the open-end-side extension part 23 and the feeding-side extension part 20 are parallel to each other.

Particularly, in the antenna 1, the feeding-side extension part 20 and the open-end-side extension part 23 are positioned in juxtaposition, such that upon power being fed to the feeding point 12*a*, a strong electric field is generated in a space between the feeding-side extension part 20 and the open-end-side extension part 23. A specific configuration of the feeding-side extension part 20 and the open-end-side extension part 23 is described below.

Figure 3:
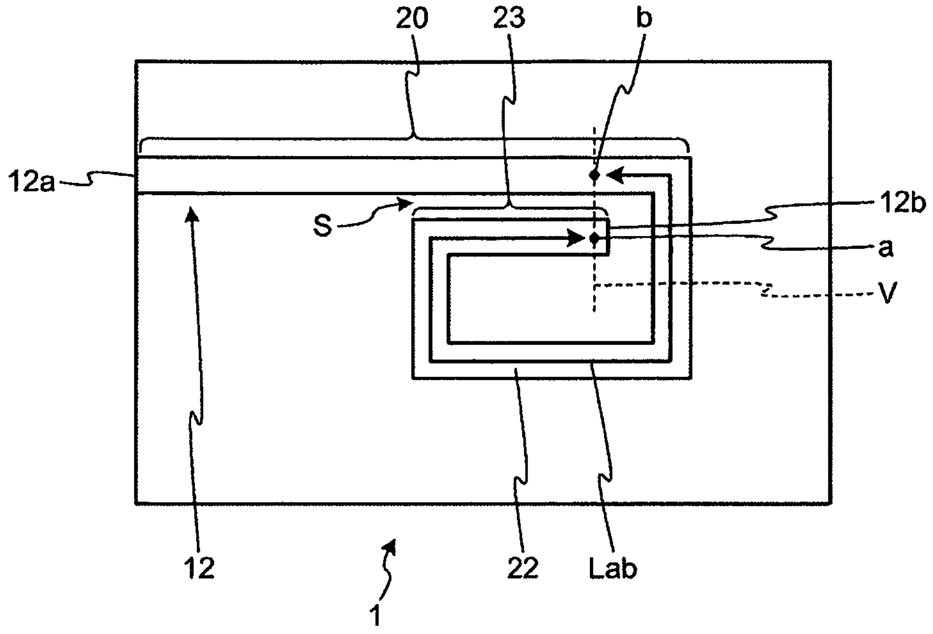
FIG. 3 is a plan view of the antenna illustrated in FIG. 1.

FIG. 3 is a plan view of the antenna 1 illustrated in FIG. 1. As illustrated in FIG. 3, when the feeding point 12*a* is fed with power, a current near the open end 12*b* becomes zero, and thus a zero point "a" at which the current is zero is generated close to the open end 12*b* of the open-end-side extension part 23. A line V that passes through the zero point "a" and that is perpendicular to the open-end-side extension part 23 is defined as a virtual straight line.

In the present embodiment, a distance "Lab" from an intersection point "b" between the virtual straight line "V" and the feeding-side extension part 20 to the zero point "a" running along length directions of the conductor pattern 12, as indicated by a double-pointed arrow illustrated in FIG. 3, is set to a distance at which a strength of an electric field obtained as both of electric fields generated at the zero point "a" and the intersection point "b" are combined upon the feeding of power enables communications with the IC tag 2 mounted on the substrate 10.

Specifically, the distance "Lab" from the zero point "a" to the intersection point "b" running along the length directions of the conductor pattern 12 is set to a half of a wavelength λ of a radio wave used for the antenna 1. The wavelength λ of the radio wave used for the antenna 1 is selected in consideration of an influence of a wavelength compression effect due to the dielectric constant of the dielectric substance used, upon a wavelength in a free space of the radio wave used. Generally, the wavelength λ of the radio wave used for the antenna 1 is influenced by a dielectric constant ∈ of the substrate 10 on which the conductor pattern 12 is formed, and thus the wavelength λ is shorter than the wavelength in the free space of the radio wave used. The wavelength λ, though depending on the thickness of the substrate 10, is compressed to approximately $1/\sqrt{\in}$ on the conductor pattern 12.

For example, when the radio wave used is a UHF radio wave (approximately 952 megahertz) and the substrate 10 is FR-4 having a dielectric constant of 4.4, the wavelength in the free space is approximately 31 centimeters, and thus the wavelength λ of the radio wave used for the antenna 1 is approximately 15 centimeters on the conductor pattern 12. Accordingly, the distance "Lab" from the zero point "a" to the intersection point "b" running along the length directions of the conductor pattern 12 is set to ½·λ, i.e., approximately 7.5 centimeters.

By setting the distance "Lab" from the zero point "a" to the intersection point "b" running along the length directions of the conductor pattern 12 to a half of the wavelength λ of the radio wave used for the antenna 1, a phase of a current at the intersection point "b" is shifted by 180 degrees relative to a phase of the current at the zero point "a".

Figure 4:
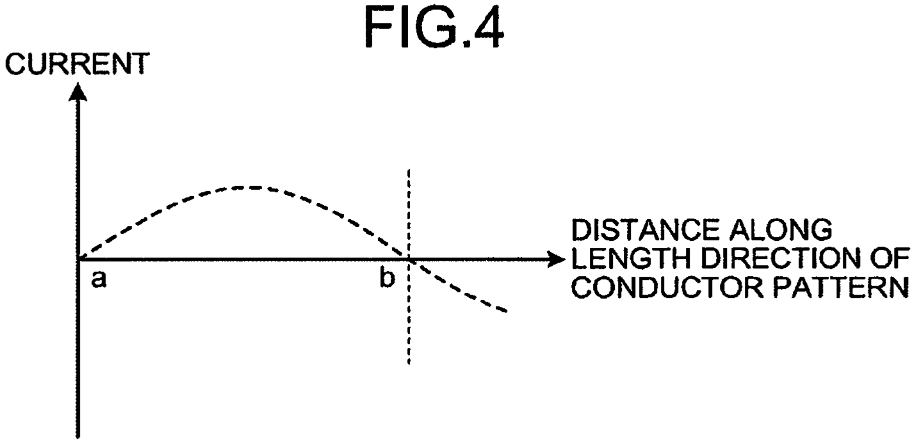
FIG. 4 is a graph indicating a current distribution along length directions of a conductor pattern.

This shift is illustrated in FIG. 4. FIG. 4 is a graph indicating a current distribution along the length directions of the conductor pattern 12. As illustrated in FIG. 4, the phase of the current at the intersection point "b" is shifted by 180 degrees relative to the phase of the current at the zero point "a", and thus, similarly to the zero point "a", the current at the intersection point "b" is zero.

Figure 5:
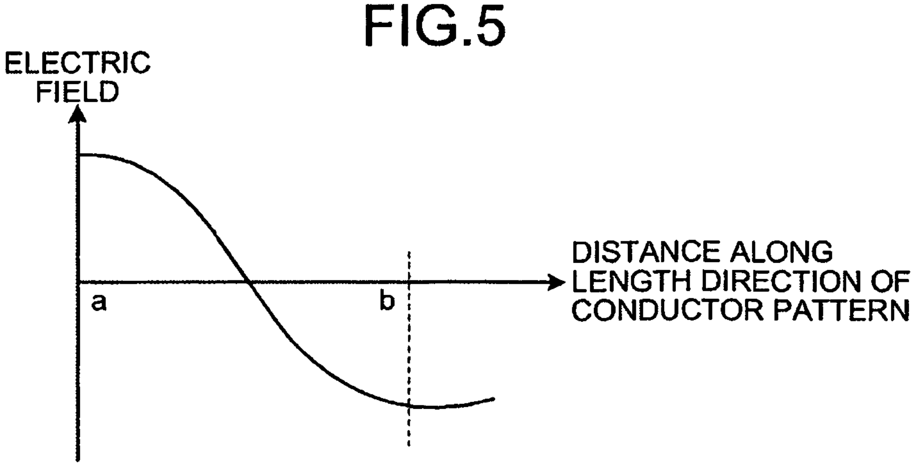
FIG. 5 is a graph indicating an electric field distribution along the length directions of the conductor pattern.

FIG. 5 is a graph indicating an electric field distribution along the length directions of the conductor pattern 12. The electric field distribution illustrated in FIG. 5 corresponds to the current distribution illustrated in FIG. 4. As illustrated in FIG. 5, when the distance "Lab" from the zero point "a" to the intersection point "b" running along the length directions of the conductor pattern 12 is set to a half of the wavelength λ of the radio wave used for the antenna 1, the electric field generated at the zero point "a" is maximum in a plus direction, and the electric field generated at the intersection point "b" is maximum in a minus direction. Thus, upon feeding power to the feeding point 12*a*, in a space "S" between the feeding-side extension part 20 and the open-end-side extension part 23, the electric field generated at the zero point "a" and that generated at the intersection point "b" are radiated in the same direction and combined.

Figure 6:
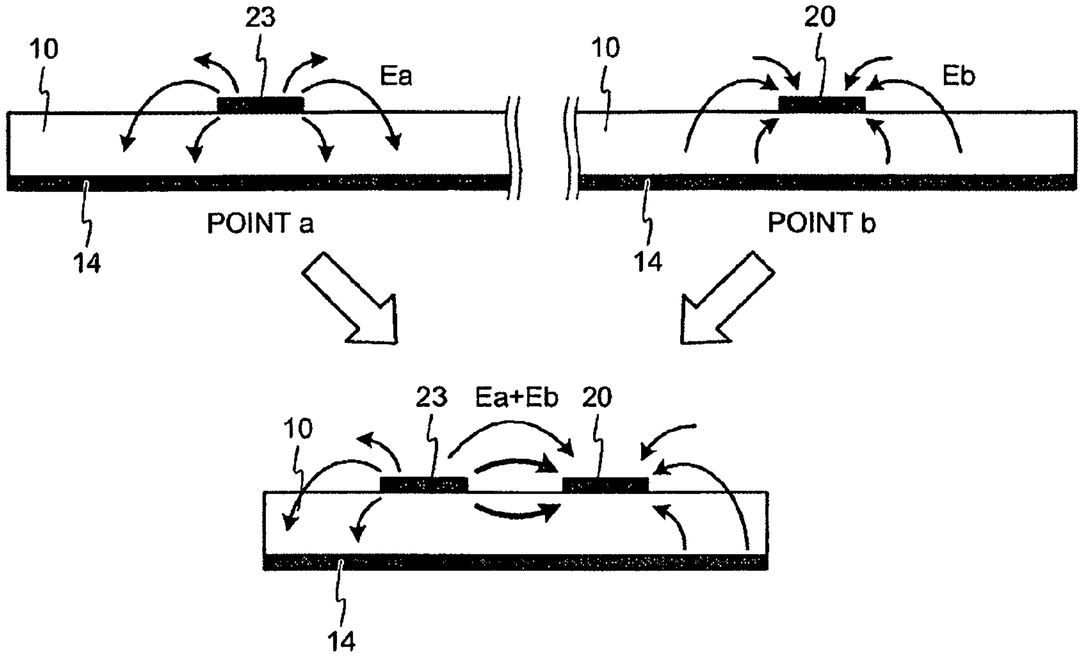
FIG. 6 is a schematic diagram of a combined state of electric fields generated at a zero point and at an intersection point.

FIG. 6 is a schematic diagram of a combined state of the electric fields generated at the zero point "a" and at the intersection point "b". FIG. 6 schematically depicts a vertical cross section of the antenna 1 taken along the virtual straight line "V" illustrated in FIG. 3.

As depicted in the upper left of FIG. 6, the strength of the electric field generated at the zero point "a" is at a maximum value "Ea". A direction of that electric field is in the plus direction, that is, in a direction away from the open-end-side extension part 23. As depicted in the upper right of FIG. 6, the strength of the electric field generated at the intersection point "b" is at a maximum value "Eb" (="Ea"). A direction of the electric field is in the minus direction, that is, in a direction toward the feeding-side extension part 20.

That is, the electric field generated at the zero point "a" and that generated at the intersection point "b" are both directed from the left side to the right side of FIG. 6 in the space "S" between the open-end-side extension part 23 and the feeding-side extension part 20, that is, from the open-end-side extension part 23 to the feeding-side extension part 20. Accordingly, as depicted in the bottom of FIG. 6, the electric field generated at the zero point "a" and that generated at the intersection point "b" both act to strengthen each other in the space "S". As a result, both of the electric fields generated at the zero point "a" and the intersection point "b" are combined in the space S, and the strength of the combined electric fields becomes Ea+Eb. The electric field strength Ea+Eb of the combined electric fields has thus been increased up to a value that enables communications with the IC tag 2 (see FIG. 2) mounted on the substrate 10.

Thus, in the present embodiment, the distance "Lab" from the zero point "a" to the intersection point "b" running along the length directions of the conductor pattern 12 is set at the distance so that the strength of the electric field generated as a combination of both of the electric fields generated at the zero point "a" and intersection point "b" upon the feeding of power enables communications with the IC tag 2. That is, the distance "Lab" is set to a half of the wavelength λ of the radio wave used for the antenna 1. In other words, the feeding-side extension part 20 and the open-end-side extension part 23 are arranged in juxtaposition with each other such that upon feeding power to the feeding point 12*a*, both of the electric fields generated at the zero point "a" and the intersection point "b" in the space S between the open-end-side extension part 23 including the zero point "a" and the feeding-side extension part 20 including the intersection point "b" strengthen each other to an extent that enables communications with the IC tag 2. Accordingly, the strength of the electric field between the feeding-side extension part 20 and the open-end-side extension part 23 in juxtaposition with each other is locally increased. Therefore, even when an inexpensive substrate having a low dielectric-constant (e.g., FR-4 or the like) is used, reduction in the radiation power can be prevented while suppressing a size increase of the antenna 1.

Figure 7:
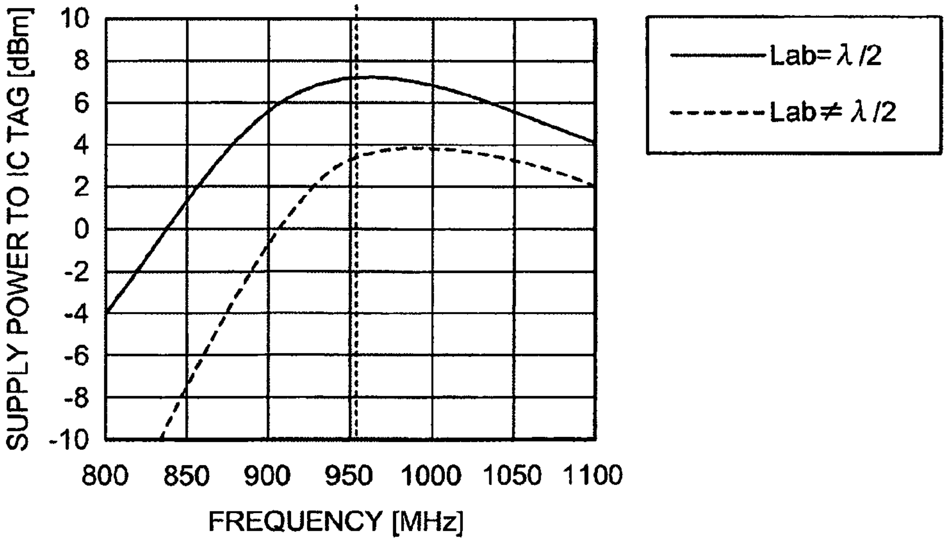
FIG. 7 is a graph indicating a relation between power supplied from the antenna to the IC tag and a frequency.

Results of examining supply power (radiation power) to the IC tag 2 using a reader-write device connected to the antenna 1 according to the present embodiment is described next. FIG. 7 is a graph indicating a relation between power supplied from the antenna 1 to the IC tag 2 and frequency, when the IC tag 2 is placed on the antenna 1 (see FIG. 2). In FIG. 7, a power input from the reader-writer device to the antenna 1 is 10 dBm.

As illustrated in FIG. 7, when the distance "Lab" from the zero point "a" to the intersection point "b" running along the length directions of the conductor pattern 12 is set to a half of the wavelength λ of the radio wave used for the antenna 1, a supply power to the IC tag 2 at a UHF-frequency of 952 megahertz is approximately 7.5 dBm. When the distance "Lab" is not a half of the wavelength λ of the radio wave used for the antenna 1, the supply power to the IC tag 2 at the UHF-frequency of 952 megahertz is approximately 3.5 dBm. From these results, it is confirmed that the supply power obtained when the distance "Lab" is set to ½·λ is approximately 4 dBm higher that the supply power obtained when the distance "Lab" is not set to ½·λ.

That is, when the distance "Lab" is set to ½·λ, the electric fields generated at the zero point "a" and at the cross point "b" become the maximum values of opposite polarities (see FIGS. 4 to 6). Thus, it becomes possible to enhance as much as possible the effect of the local increase in the strength of the electric field between the feeding-side extension part 20 and the open-end-side extension part 23 in juxtaposition with each other.

When the distance "Lab" is not set to ½·λ, the supply power to the IC tag 2 is reduced. This is because both of the electric fields generated at the zero point "a" and the intersection point "b" become less than the maximum values, and thus the strength of the electric field generated as the combination of the electric fields generated at the zero point "a" and the intersection point "b" is weakened in the space S between the feeding-side extension part 20 and the open-end-side extension part 23.

Accordingly, it is preferable to select, as the distance "Lab", a value at which the strength of the electric field generated as the combination of the electric fields generated at the zero point "a" and the intersection point "b" upon feeding power does not become less than a value that enables communications with the IC tag 2. That is, even when the distance "Lab" is not a half of the wavelength λ of the radio wave used for the antenna 1, it is preferable that the distance "Lab" is set equal to or more than ¼ and equal to or less than ¾ of the wavelength λ of the radio wave used for the antenna 1. By setting the distance "Lab" equal to or more than ¼ and equal to or less than ¾ of the wavelength λ of the radio wave used for the antenna 1, the strength of the electric field generated as the combination of the electric fields generated at the zero point "a" and the intersection point "b" is retained at a value not less than a value that enables communications with the IC tag 2, in the space S between the feeding-side extension part 20 and the open-end-side extension part 23.

Figure 8:
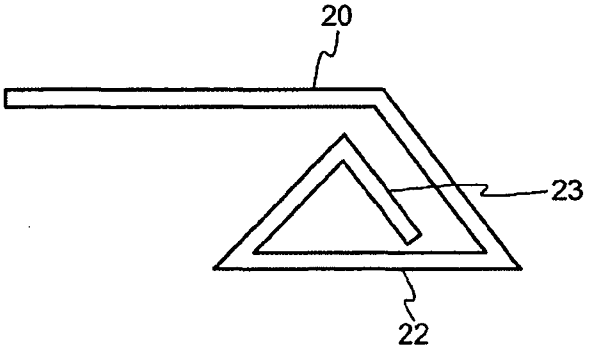
FIG. 8 is a diagram of a modified example of the antenna according to the embodiment.
Figure 9:
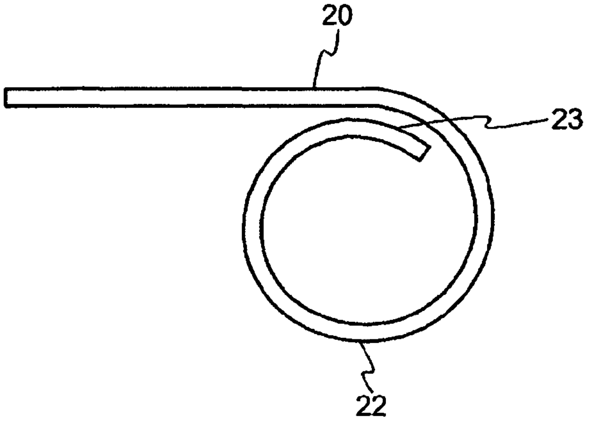
FIG. 9 is a diagram of another modified example of the antenna according to the embodiment.

In the present embodiment, the spiral part 22 is quadrangular, but a polygonal shape such as a triangular shape illustrated in FIG. 8 or a circular shape illustrated in FIG. 9 may be adopted.

Figure 10:
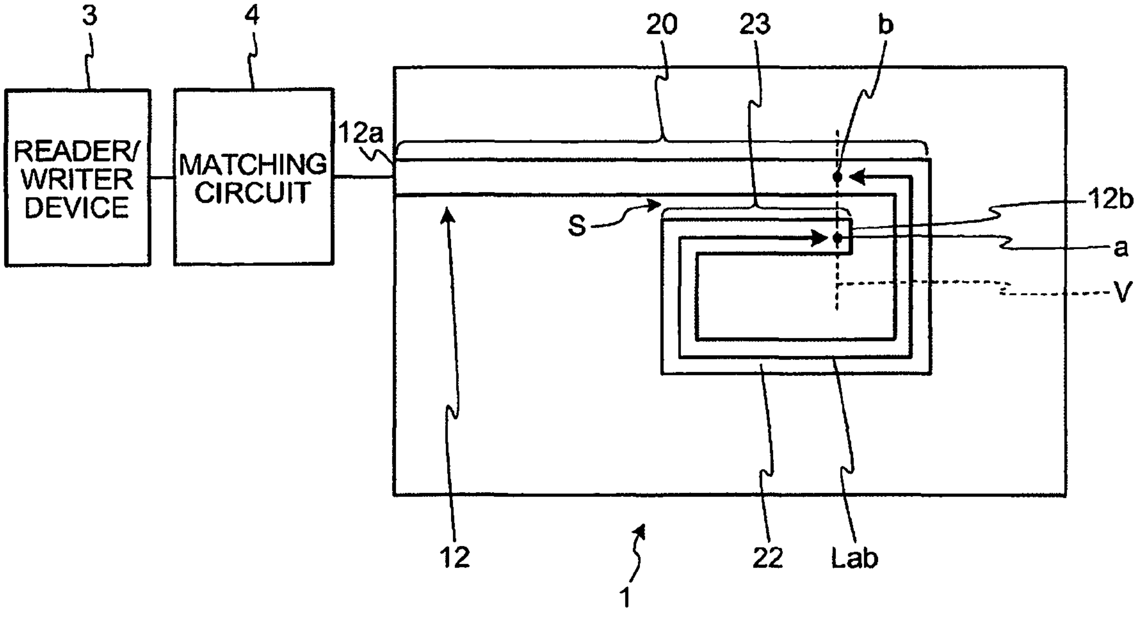
FIG. 10 is a diagram indicating a state in which the antenna according to the embodiment is connected to a reader/writer device.

As illustrated in FIG. 10, the antenna 1 is connected to a reader/writer device 3 via the feeding point 12*a*. The antenna 1 is preferably connected to the reader/writer device 3 through a matching circuit 4 having an impedance of 50 ohms, for example. By arranging the matching circuit 4 between the antenna 1 and the reader/writer device 3, matching of the impedance between the antenna 1 and the reader/writer device 3 is facilitated, and the performance of the reader/writer device 3 is effectively exercised.

Figure 11:
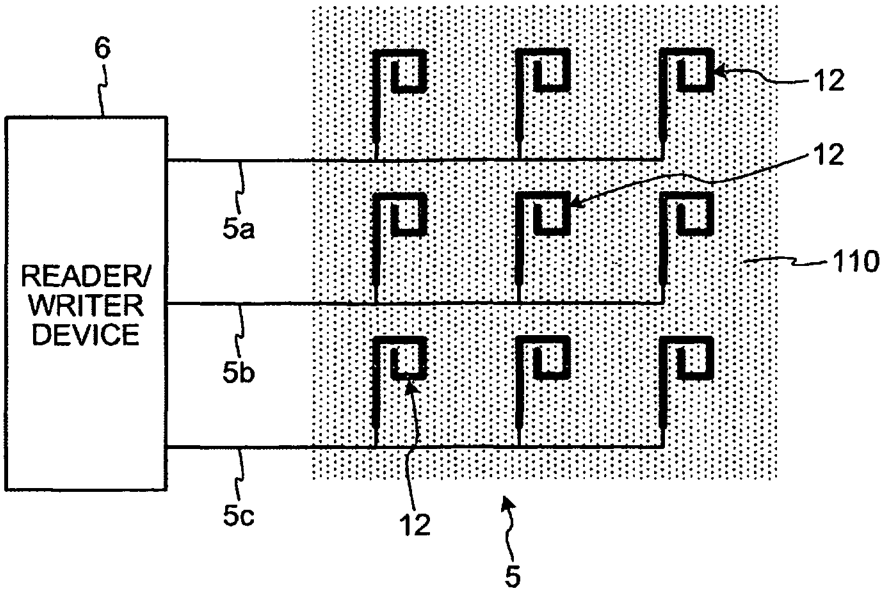
FIG. 11 is a schematic diagram of an application example of the antenna including the conductor pattern according to the embodiment.
Figure 12:
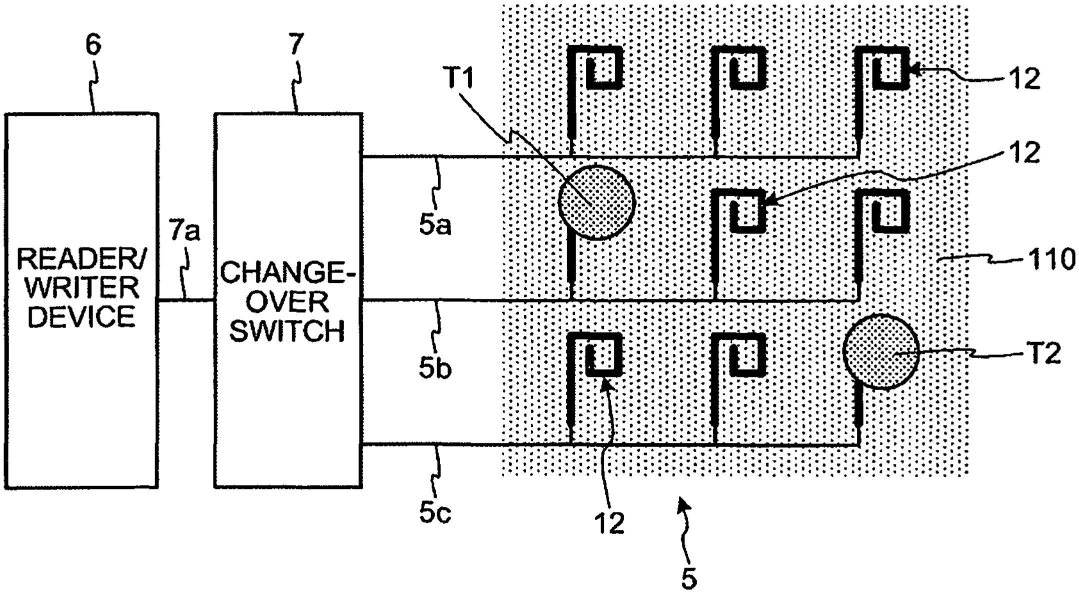
FIG. 12 is a schematic diagram of another application example of the antenna including the conductor pattern according to the embodiment.
Figure 13:
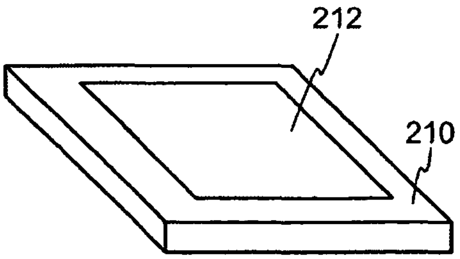
FIG. 13 is a perspective view of a configuration of a patch antenna.

An application example of an antenna including the conductor pattern 12 according to the present embodiment is explained. FIGS. 11 and 12 are schematic diagrams of the application example of the antenna including the conductor pattern 12. The same reference signs are used to refer to parts identical to those explained above to omit any redundant explanations.

As illustrated in FIG. 11, an antenna 5 according to the application example includes on a substrate 110 made of a dielectric substance, a plurality of the conductor patterns 12 disposed in a matrix. A two-dimensional position of each conductor pattern 12 on the substrate 110 is defined in advance. The conductor patterns 12 are each electrically connected to a reader/writer device 6 via wirings 5_a_ to 5_c_ connected to the feeding point 12_a_. Due to such a configuration, when the IC tag (not illustrated) is placed at the position of any one of the conductor patterns 12 on the substrate 110, the reader/writer device 6 is able to easily identify the position of the IC tag on the substrate 110 based on a signal received via the wirings 5_a_ to 5_c_ from the conductor pattern 12 at which the IC tag is placed.

In an application example illustrated in FIG. 12, a change-over switch 7 is disposed between the antenna 5 and the reader/writer device 6 illustrated in FIG. 11. The change-over switch 7 is connected via the wirings 5_a_ to 5_c_ to the antenna S, that is, to the plurality of conductor patterns 12, and also, connected via a wiring 7_a_ to the reader/writer device 6. The change-over switch 7 selectively transmits to the reader/writer device 6 signals transmitted via the wirings 5_a_ to 5_c_ from the plurality of conductor patterns 12. For example, when the change-over switch 7 selects the signal from the three conductor patterns 12 on the very left side of FIG. 12 on the substrate 110, the signals from the remaining conductor patterns 12 are not transmitted to the reader/writer device 6. Therefore, a position of an IC tag T1 placed in the middle of the left side of FIG. 12 is identified by the reader/writer device 6, but a position of an IC tag T2 placed at the bottom right of FIG. 12 is not identified by the reader/writer device 6. Accordingly, by connecting the plurality of conductor patterns 12 via the change-over switch 7 to the reader/writer device 6, various approaches for identifying positions of IC tags are possible.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An antenna connectable to a reader-writer device configured to be communicatable with a wireless tag, the antenna comprising:

a substrate made of a dielectric substance; and a conductor pattern formed on the substrate and including a feeding point at one end of the conductor pattern, via which the antenna is connectable to the reader-writer device, an open end at another end of the conductor pattern, a feeding-side extension part extending for a first predetermined distance from the feeding point, and a spiral part extending spirally in a spiral shape from an opposite end of the feeding-side extension part opposite to the feeding point to the open end being a terminal end of the spiral part, the spiral part including the open end and an open-end-side extension part positioned in juxtaposition with the feeding-side extension part, wherein a distance along length directions of the conductor pattern, from a zero point at which a current is zero in the open-end-side extension part upon feeding power to the feeding point, to an intersection point at which a virtual straight line perpendicular to the open-end-side extension part and passing through the zero point intersects the feeding-side extension part, is equal to or more than ¼ and equal to or less than ¾ of a wavelength of a radio wave used for the antenna.

2. The antenna according to claim 1, wherein the distance is equal to a half of a wavelength of a radio wave used for the antenna.

3. The antenna according to claim 1, wherein the spiral part is polygonal in shape.

4. The antenna according to claim 1, wherein the spiral part is circular in shape.

5. A reader-writer device comprising:

a reader-writer configured to be communicatable with a wireless tag; and an antenna connectable to the reader-writer, the antenna including:

a substrate made of a dielectric substance; and a conductor pattern formed on the substrate and including a feeding point at one end of the conductor pattern, via which the antenna is connectable to the reader-writer, an open end at another end of the conductor pattern, a feeding-side extension part extending for a first predetermined distance from the feeding point, and a spiral part extending spirally in a spiral shape from an opposite end of the feeding-side extension part opposite to the feeding point to the open end being a terminal end of the spiral part, the spiral part including the open end and an open-end-side extension part positioned in juxtaposition with the feeding-side extension part, wherein a distance along length directions of the conductor pattern, from a zero point at which a current is zero in the open-end-side extension part upon feeding power to the feeding point, to an intersection point at which a virtual straight line perpendicular to the open-end-side extension part and passing through the zero point intersects the feeding-side extension part, is equal to or more than ¼ and equal to or less than ¾ of a wavelength of a radio wave used for the antenna.

* * * * *